United States Patent
Fleck et al.

(10) Patent No.: US 7,376,913 B1
(45) Date of Patent: May 20, 2008

(54) NAVIGATION AND SELECTION CONTROL FOR A HAND-HELD PORTABLE COMPUTER

(75) Inventors: Rod G. Fleck, Bellevue, WA (US); Michael N. Agostino, Kirkland, WA (US); Martin J. Kee, Sammamish, WA (US); Michael L. Moskowitz, Kirkland, WA (US)

(73) Assignee: Vulcan Portals Inc., Seattle, WA (US)

( * ) Notice: Subject to any disclaimer, the term of this patent is extended or adjusted under 35 U.S.C. 154(b) by 681 days.

(21) Appl. No.: 10/338,815

(22) Filed: Jan. 7, 2003

(51) Int. Cl.
   *G06F 3/00* (2006.01)
   *G09G 5/00* (2006.01)
(52) U.S. Cl. ..................... 715/864; 715/808
(58) Field of Classification Search ............... 455/466; 715/853
   See application file for complete search history.

(56) References Cited

U.S. PATENT DOCUMENTS

| | | | | |
|---|---|---|---|---|
| 5,537,343 | A * | 7/1996 | Kikinis et al. ............... | 361/687 |
| 5,560,022 | A | 9/1996 | Dunstan et al. | |
| 5,650,831 | A | 7/1997 | Farwell | |
| 5,689,669 | A * | 11/1997 | Lynch et al. ................ | 715/848 |
| 5,763,960 | A | 6/1998 | Ceccherelli et al. | |
| 5,768,164 | A | 6/1998 | Hollon, Jr. | |
| D416,256 | S | 11/1999 | Griffin et al. .............. | D14/191 |
| 5,978,923 | A | 11/1999 | Kou | |
| 6,088,809 | A | 7/2000 | Atkinson | |
| D433,460 | S | 11/2000 | Griffin et al. .............. | D21/329 |
| 6,243,819 | B1 | 6/2001 | Jung et al. | |
| 6,278,442 | B1 | 8/2001 | Griffin et al. ............... | 345/169 |
| 6,313,731 | B1 | 11/2001 | Vance | |
| 6,392,640 | B1 * | 5/2002 | Will ............................ | 345/184 |
| 6,396,482 | B1 | 5/2002 | Griffin et al. ............... | 345/169 |
| D460,493 | S | 7/2002 | Griffin et al. .............. | D21/329 |
| D461,803 | S | 8/2002 | Griffin et al. .............. | D14/346 |
| 6,452,588 | B2 | 9/2002 | Griffin et al. ............... | 345/169 |

(Continued)

FOREIGN PATENT DOCUMENTS

EP   1028425   8/2000

(Continued)

OTHER PUBLICATIONS

Strietelmeier, J., "Official Gadgeteer Hands On Review: RIM BlackBerry 950 Internet Edition," http://www.the-gadgeteer.com/rim-blackberry-review.html., Feb. 26, 2001, 6 pages [internet accessed Aug. 3, 2005].

*Primary Examiner*—Weilun Lo
*Assistant Examiner*—Jorany Nunez
(74) *Attorney, Agent, or Firm*—Perkins Coie LLP (57) ABSTRACT

A hand-held portable computer is provided with a control wheel to accelerate navigation and selection that is otherwise difficult due to the small form factor of the portable computer. The wheel is turned in a first or in a second direction to scroll through an on-screen menu. The wheel is pressed to select a particular item from the on-screen menu for execution. Context-sensitivity is provided in that the underlying software determines which menu to display or command to execute, in response to dialing or clicking the wheel, based on which application and pane are currently active and based on which item in the pane is currently selected. User-configurability and extensibility to additional applications are provided, without modification of the underlying software application code.

30 Claims, 5 Drawing Sheets

U.S. PATENT DOCUMENTS

| | | |
|---|---|---|
| D464,995 S | 10/2002 | Griffin et al. .............. D21/329 |
| 6,489,950 B1 | 12/2002 | Griffin et al. ................ 345/168 |
| 6,664,991 B1 * | 12/2003 | Chew et al. ................ 715/863 |
| 6,711,631 B1 | 3/2004 | Chan et al. |
| 6,741,232 B1 * | 5/2004 | Siedlikowski et al. ...... 345/156 |
| 6,760,851 B2 | 7/2004 | Teshima et al. |
| 6,922,759 B1 | 7/2005 | Garritsen |
| 2002/0087225 A1 | 7/2002 | Howard |
| 2003/0023700 A1 | 1/2003 | Swinton et al. |
| 2003/0081016 A1 | 5/2003 | Rahimzadeh et al. |
| 2003/0149904 A1 | 8/2003 | Kim |
| 2003/0156074 A1 | 8/2003 | Ranganathan et al. |
| 2004/0003225 A1 | 1/2004 | Cheng et al. |
| 2004/0268004 A1 | 12/2004 | Oakley |
| 2005/0066006 A1 | 3/2005 | Fleck et al. |
| 2005/0066207 A1 | 3/2005 | Fleck et al. |
| 2005/0076256 A1 | 4/2005 | Fleck et al. |

FOREIGN PATENT DOCUMENTS

| | | |
|---|---|---|
| WO | WO-03/029945 | 4/2003 |

* cited by examiner

TO: GINA V.
FROM: DENNIS D.
SUBJECT: RE: DINNER
DATE: 12/30/02

HOW ABOUT 8:00PM
TOMORROW NIGHT?

NAVIGATION AND SELECTION CONTROL FOR A HAND-HELD PORTABLE COMPUTER

BACKGROUND OF THE INVENTION

1. Field of the Invention

The present disclosure relates generally to hand-held portable electronic devices, and in particular but not exclusively, relates to a control wheel for a hand-held portable computer that is usable for navigation and selection.

2. Description of the Related Art

Modern desktop computers provide users with user-input mechanisms that are well suited for the applications that run on these computers. For example, desktop computers often use a mouse that allows the user to conveniently navigate through menus, panes, and features of an application, as well as allowing navigation between applications and selection of various choices (usually via a "point and click" or a "click and drag") within a given application. Moreover, applications usually provide complex, yet convenient, graphical user interfaces (GUIs) that are designed to work in conjunction with the point and click features of a mouse or with particular keys on a keyboard of a desktop computer.

The nature of a desktop computer makes them ideal for using user-input devices such as a mouse and/or keyboard. There is usually sufficient desktop space or keyboard size to allow the user to easily navigate through an application or to select from various choices, without having to struggle with dexterity issues and awkward positioning. However, with laptop computers, a common complaint from users is that the keyboard is too small or that the mouse is difficult to control. The user has to "crowd" his fingers in order to properly use and select the appropriate keys on the keyboard, and has to use a mouse that is more difficult to use because it is physically integrated within the keyboard, rather than being an attached peripheral that can be conveniently used at arm's length away from the keyboard.

While laptops do have these disadvantages, they are, for the most part, adequate in terms of navigation and selection controls (via the mouse and keyboard). However, with ultra-portable devices, such devices typically have a substantially smaller form factor than a laptop or desktop computer. Their keyboards are significantly smaller than normal laptops and desktop computers, with "tiny" keys on the keypad. The keypads are of such a small size that the user can typically use only one or two fingers at a time to perform typing. Moreover, these devices also have a correspondingly and significantly smaller display screen size.

A possible solution to these problems is to create applications that have GUIs or other features that are better suited for devices that have smaller form factors than conventional laptop or desktop computers. However, this is not an ideal solution since it would require software manufactures to develop two types of each application: an application usable for desktop/laptop computers and the same application usable for smaller devices. This additional software development is costly and would not necessarily benefit the consumer, since not all software applications can be expected to have versions that are usable for smaller devices and the user may be required to learn both applications.

Moreover, if a standard application is installed into small device, it is difficult, if not impossible, for the typical user to alter the application in order to make it user-friendlier for the small device. This is because the source code for the application is often a closely guarded secret by the software manufacturer and because most users are not well versed in software programming. Also, even if one application installed in the small device is modified to be more user friendly for that device, other applications installed or to be installed in the device may not be capable of similar modification—there is a scalability problem.

BRIEF SUMMARY OF THE INVENTION

One aspect of the invention provides a system having a display screen that is included as part of a hand-held portable electronic device having a small form factor. A control is integrated with the electronic device to facilitate control over navigation and selection within the display screen based on the small form factor of the electronic device. A first type of user actuation of the control facilitates control over the navigation, and a second type of user actuation of the control facilitates control over the selection. Software allows operation of the control in conjunction with an application installed in the electronic device, in a manner that allows user-configuration over the operation of the control and that allows extension of the operation of the control to an additional application, substantially without modification of code for the applications.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a navigation and selection control for a hand-held portable computer are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a hand-held portable electronic device having a small form factor. The portable device comprises a portable computer, according to an embodiment, having a flip-top display screen and a keyboard. Because of the small size of the portable computer, a selection and navigation control is provided that is easier to use than a keyboard and/or mouse integrated on the keyboard. The control enhances the ability of the user to work with a small screen and keyboard. One example implementation of the selection and navigation control is a wheel, located at the side of the portable computer, for instance.

The wheel can be turned or dialed (e.g., a first type of user actuation) in a first or in a second direction to scroll (or otherwise navigate) through an on-screen menu. The wheel can be pressed or "clicked" (e.g., a second type of user actuation) to select a particular item from the on-screen menu. After the item is selected, the corresponding command is executed or a sub-menu may be displayed (from which items can be subsequently scrolled through by dialing the wheel or can be selected by clicking on the wheel). Context-sensitivity is provided in that the underlying software determines which menu to display or command to execute, in response to dialing or clicking the wheel, based on which application and pane are currently active and based on which item in the pane is currently selected, or based on some other active element associated with the application.

Because the wheel is used alternatively to the mouse and keyboard, selection and execution of particular application commands can be accelerated or otherwise facilitated. Also, user-configurability and extensibility (or scalability) are provided. Moreover, the underlying software components that are used in conjunction with the wheel can be installed and operated without the need to modify the applications to which they are applied. Thus, embodiments of the invention provide an apparatus and method for accelerating a mouse-based GUI interface or mouse-based application using the control wheel, without modification of the application code.

Figure 1:
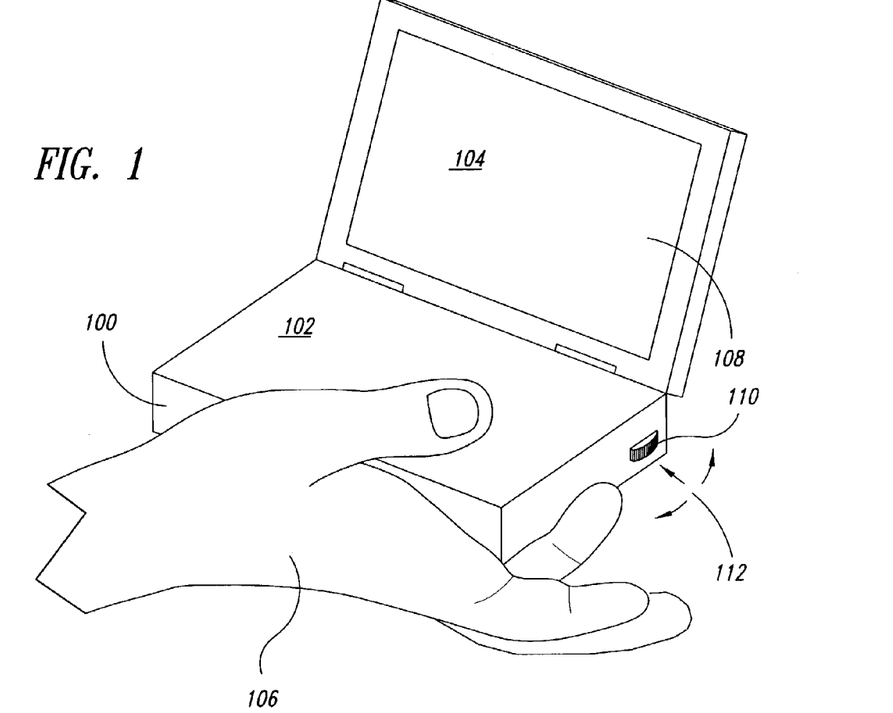
FIG. 1 shows a portable hand-held computer in accordance with an embodiment of the invention.

FIG. 1 shows a portable hand-held computer 100 in accordance with an embodiment of the invention. While the portable computer 100 is used as the illustrative example throughout this application, it is appreciated that other embodiments of the invention may be implemented with devices that may not necessarily be thought of as a "computer" by the average individual. Examples include wireless communication devices, display devices, monitors, audio-video equipment, consumer electronic devices, or other electronic device that can have a reduced form factor and which can have user interface issues that are addressable by the principles of the invention described herein.

As shown, the portable computer 100 is similar in appearance to a laptop computer, in that it comprises first and second portions 102 and 104, respectively. The first portion 102 can include a keyboard and housing for the internal electronic components (such as a processor, disk drives, graphics drivers, and so forth). The second portion 104 folds over the first portion 102 (when in a closed position), and includes a display screen 108 for displaying information while the second portion 104 is unfolded to an upright position (as shown in FIG. 1).

Unlike a conventional laptop computer, however, the portable computer 100 is substantially smaller in size in terms of both volume and weight. An example dimensional size of the portable computer 100 is 140 mm long, 101 mm wide, and 30 mm thick (while closed), with a weight of approximately one pound. The display screen 108 on the second portion 104 is of a resolution comparable to a desktop computer monitor. In general, the size of the display screen 108, the size of the internal components (e.g., chips and circuit boards) located within the first portion 102, and the strategic placement of the internal components (e.g., density), and other factors will influence the overall form factor of the portable computer 100. As illustrated in FIG. 1, the portable computer 100 has a size such that it can be held securely in a hand 106 of a user.

In one embodiment, the portable computer 100 includes a control usable for navigation through or between applications and for selection of items therein. Such a control may be used in addition or alternative to other controls that may be present on the keyboard, such as a mouse, arrow keys, page up/down keys, and the like. An embodiment of this control is depicted as a dial or wheel 110 in FIG. 1. While a wheel has been illustrated and will be described throughout this application, it is appreciated that other embodiments of the invention may provide a control, usable for navigation and selection and other capabilities, that is different than a wheel.

In one embodiment, the wheel 110 is located on a side of the portable computer 100. Thus in FIG. 1, the wheel 110 is located on the right side of the housing of the portable computer 100, and towards the rear end. This location is advantageous given the small size of the portable computer 100, since the wheel 110 is conveniently located in a manner such that the fingertips of the user's hand 106 can easily turn or press the wheel 110 while holding the portable computer 100. The turning (e.g., dialing) and pressing of the wheel 100 are indicated by arrows 112 in FIG. 1.

Figure 2:
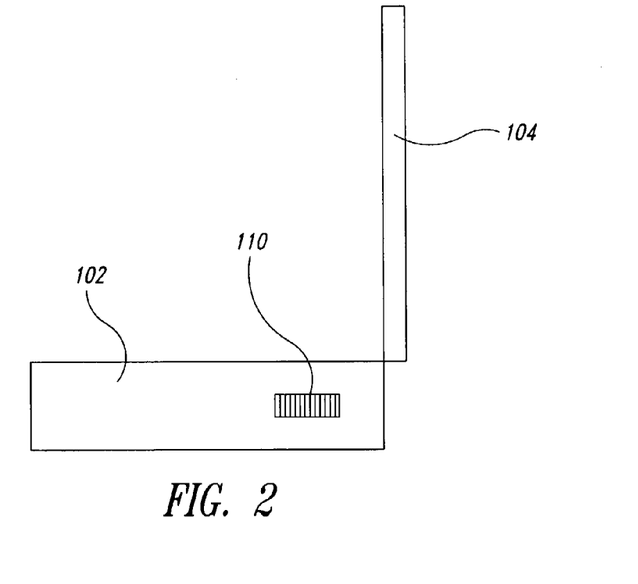
FIG. 2 is a side view of the portable computer of FIG. 1, showing a control wheel in accordance with an embodiment of the invention.

FIG. 2 is a side view of the portable computer 100 of FIG. 1, showing the control wheel 110 in accordance with an embodiment of the invention. Again, the wheel 110 is located towards the rear end of the portable computer 100, and is aligned in a generally horizontal direction. This alignment provides easier user control with a fingertip, and also provides a degree of orientational correspondence with an on-screen menu on the display screen 108 that has selectable items listed vertically therein.

Figure 3:
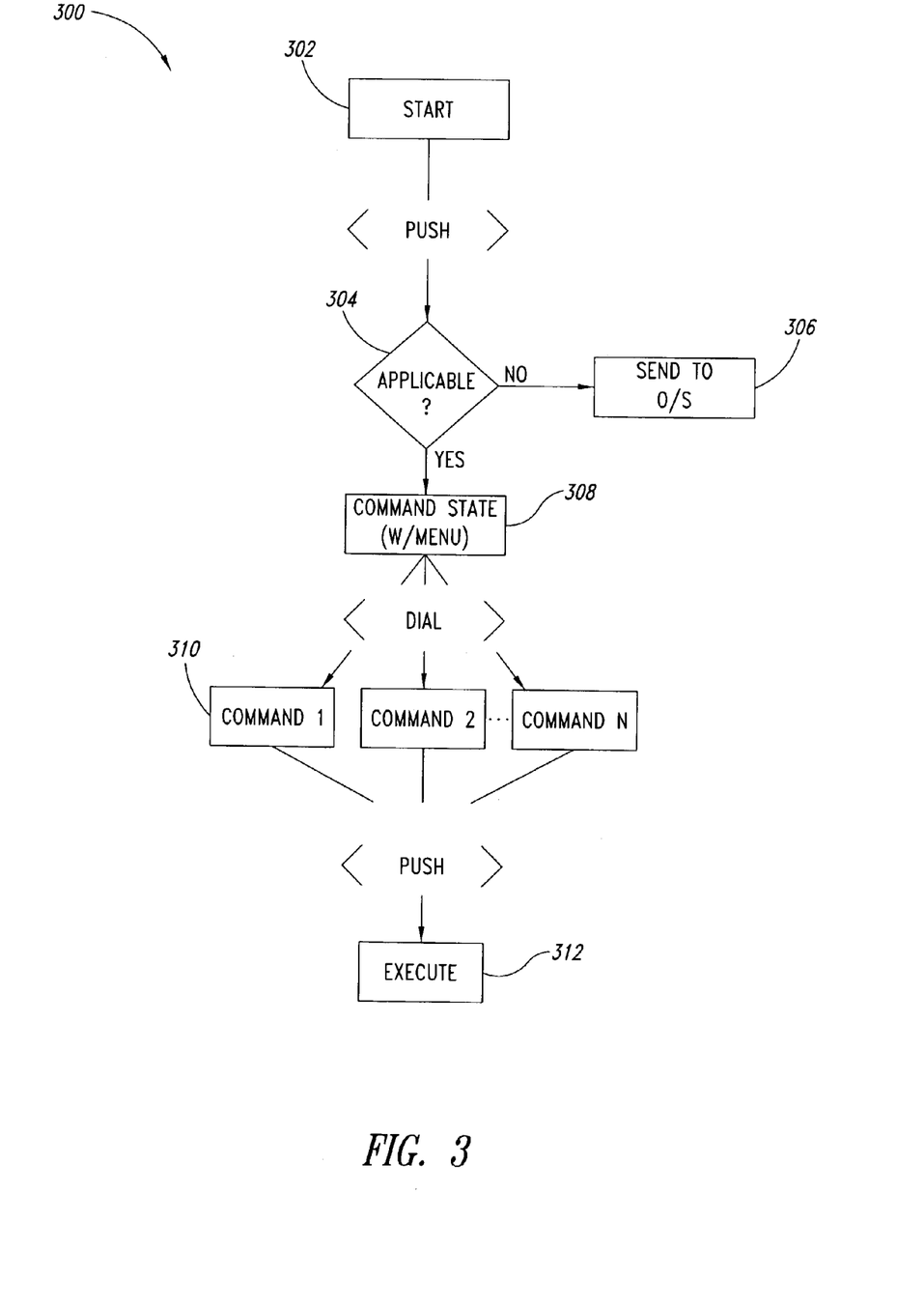
FIG. 3 is a flowchart illustrating operational states in connection with use of the control wheel of FIG. 2 in accordance with an embodiment of the invention.

FIG. 3 is a flowchart 300 illustrating operational states in connection with use of the control wheel 100 of FIGS. 1-2 in accordance with an embodiment of the invention. A start state 302 occurs when an application is currently active, when a desktop menu is currently rendered, or other operational state when the underlying hardware and software are waiting for activity from the wheel 110.

Activity is detected when the wheel 110 is pushed (e.g., pressed). At a decision block 304, the underlying software makes a determination whether the pushing of the wheel 110 is an action that it can process or is otherwise applicable. For example, if an application is currently active, the underlying software at the block 304 can readily conclude that the pushing is directed to that application. In contrast, if no application is currently active (e.g., only a desktop is rendered, with no currently selected item), then the pressing is filtered out by the software and sent to the operating system (such as Microsoft Windows™) for further processing at a state 306.

If, however, the decision block 304 determines that the pushing is applicable, then the software determines which application is active, which pane of that application is currently open, and which item in that pane is currently selected, and enters a command state 308. At the command state 308, one or more on-screen menus are rendered that are context-sensitive to the corresponding application, pane, and selected pane item. It is noted that some applications only have a single pane or may not even have separate items to select (e.g., a battery meter) but may have commands to invoke (e.g., lower power, full power, standby, etc.).

From the menu(s) at the command state 308, the user can use the wheel 110 to dial (e.g., scroll) through several possible commands 310 listed in the menu(s). There can be any suitable number of possible commands for the particular command state 308, with the commands being represented as Command 1, Command 2 . . . . Command N in FIG. 3. When the user has scrolled to a desired command or other choice on the displayed menu, then another push of the wheel 110 selects and executes that command during an execution state 312.

Figure 4:
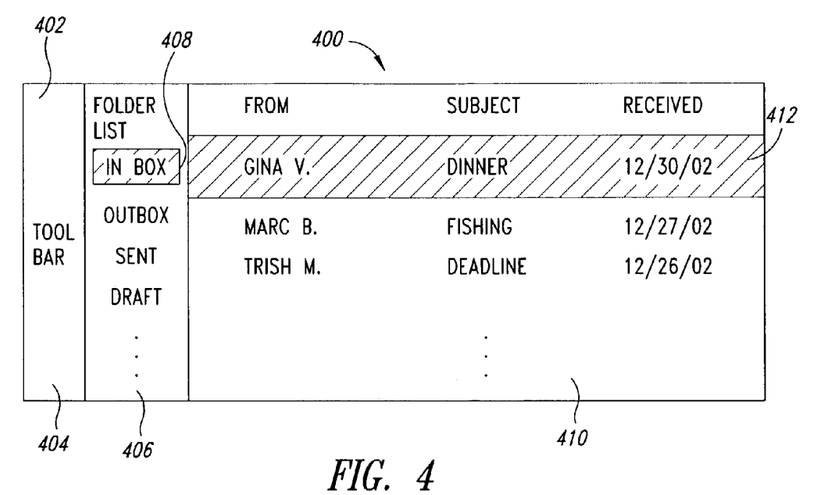
FIGS. 4-6 are example screen shots depicting use of the control wheel according to the operational states of FIG. 3.
Figure 5:
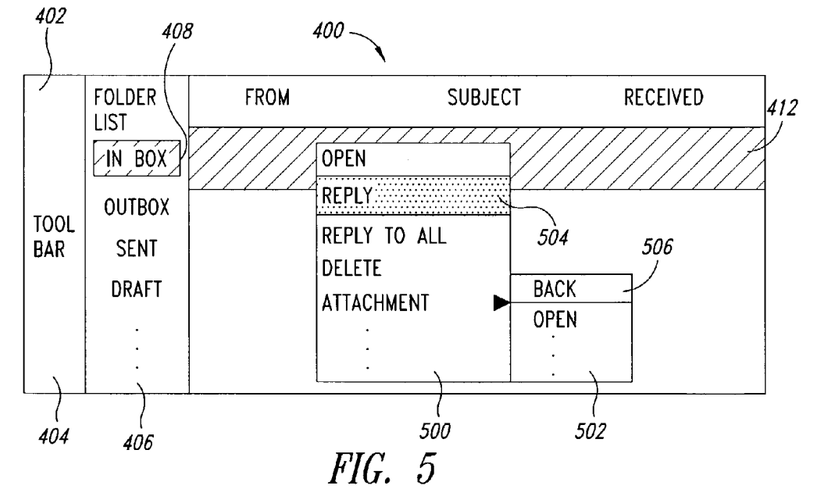
Figure 6:
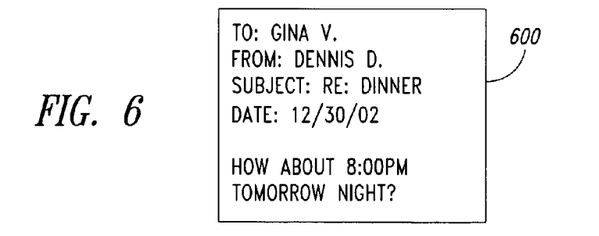

FIGS. 4-6 are example screen shots from the display screen 108 depicting use of the control wheel 110 according to the operational states of FIG. 3. For purposes of illustration and explanation, the screen shots of FIGS. 4-6 will be described in terms of an email application (such as Microsoft Outlook™), and it is understood that other email applications or other applications different from email applications (such as spreadsheet, graphics, web browser, etc. applications) may also be used.

Beginning first with FIG. 4, an email application 400 is currently active on the display screen 108. FIG. 4 can correspond to the operational start state 302 of FIG. 3, where the system is awaiting for a push of the wheel 110 by the user.

The email application 400 includes a GUI 402 having a tool bar 404 and a folder list 406. An inbox folder 408 is currently selected (such as by default), thereby resulting in an active pane 410 corresponding to the inbox folder 408. The active pane 410 includes a list of emails that have been received by the user, with an email 412 from Gina V. (received on Dec. 30, 2002 and regarding "Dinner") being the currently selected item in the pane 410 (such as by default by virtue of being at the top of the list of emails).

If the user presses the wheel 110 while viewing the GUI 402 of FIG. 3, then the command state 308 is entered as a result, and the screen shot of FIG. 5 is rendered. For example, if the wheel 110 is pressed while the inbox pane 410 is active and while Gina's email 412 is selected, then the underlying software identifies which application (e.g., the email application 400) is active, which pane (e.g., the inbox pane 410) in that application is active, and which item (e.g., Gina's email 412) is currently selected. In an embodiment, the software may use other item-specific information to determine which menu to display or which item is the default choice. This item-specific information can include data indicative of a state of a selected item. For example, for email message, it may determine if the message has been read or not. If it has already been read, the software may show a menu where "Delete" is the default choice. For unread messages, it may use "Open" or "Reply" as the default choices.

The appropriate menu 500 is then chosen and rendered, so as to provide a context-sensitive menu. In this particular example in FIG. 5, the menu 500 includes selections or commands that correspond to a received email in the inbox folder 408: Open, Reply, Reply to All, Delete, Attachment, etc. One or more sub-menus may be accessed, such as a sub-menu 502 corresponding to the Attachment selection from the menu 500. The sub-menu 502 contains context-sensitive choices for the Attachment selection, such as Open, Copy, Save, etc., which corresponds to the commands 310 of FIG. 3. Sub-menus may be accessed by successive dialing and pushing of the wheel 110, and the user can "go back" to a prior menu by dialing to a Back selection 506 and then pushing the wheel 110.

In an embodiment, the menu(s) 500, sub-menu(s) 502, items listed or selectable therein, or whether or not to display a particular menu in response to a press of the wheel 110 are user-configurable. Thus for the menu 500, the user can configure inbox menu selections such that the Delete selection is not displayed or is not selectable, for instance, so as to prevent inadvertent deletion via the wheel 110. As another example, the user can configure the settings such that no menus are rendered if the user pushes the wheel 110 while the Draft folder is currently active. As yet another example, the user can add, delete, change, or create new commands. According to an embodiment, such user-configurable settings may be performed via use of one or more extensible markup language (XML) files. The various menus and sub-menus can comprise pop-up windows, screen overlays, cascading style sheets, pull-down menus, and the like.

When the menu 500 is rendered during the command state 308, the user can use the wheel 110 to dial through the choices in order to make a selection. For example, the user can dial to the Reply selection 504 (to reply to Gina's email) and then push the wheel 110 to select that command. In response to selection of the Reply selection 504, an email reply 600 in FIG. 6 can be rendered at the execution state 312. Thereafter, the user can use the keys on the keypad of the portable computer 100 to type a reply to Gina's email.

Figure 7:
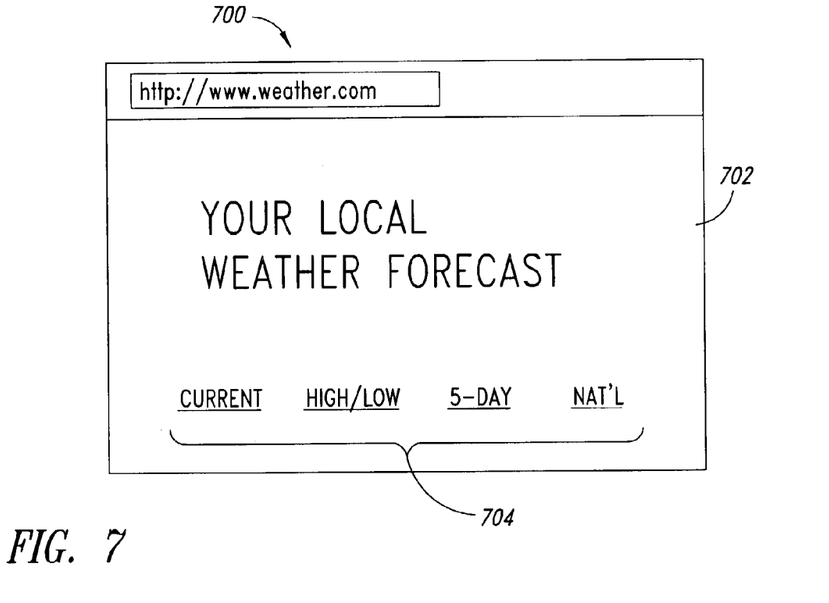
FIGS. 7-8 are additional example screen shots depicting use of the control wheel according to the operational states of FIG. 3.
Figure 8:
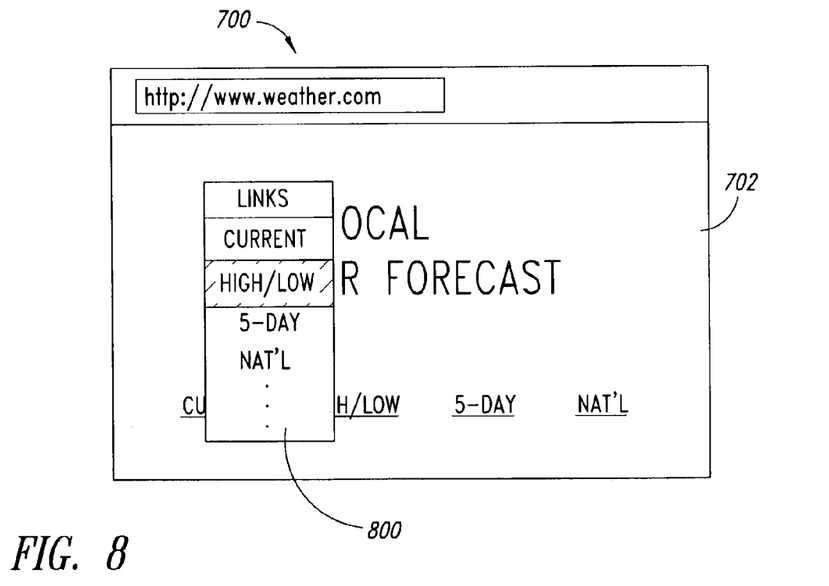

FIGS. 7-8 are additional example screen shots depicting use of the control wheel 110 according to the operational states of FIG. 3. These particular examples illustrate a web browser application, such as Microsoft Internet Explorer™, and it is appreciated that other types of browser application or other application may be used. In the example of FIG. 7, the user has accessed a web page 702 that provides local weather information. The web page 702 has a plurality of hypertext links 704, such as Current, High/Low, 5-Day, National, and so forth. The screen shot of FIG. 7 may be what the user sees on the display screen 108 during the operational start state 302, while the system is awaiting a push of the wheel 110.

If the user then pushes the wheel 110, the software identifies that a web browser is currently active, which particular pane or page is rendered, and which hypertext links 704 are available on that web page. Identification of which hypertext links are available may be performed, for instance, by reading the hypertext markup language (HTML) file for that web page 702 and parsing out the hypertext links, uniform resource locator (URL) addresses, or other resource information indicated therein.

The pushing of the wheel 110 causes the command state 308 to be entered, in which a menu 800 of FIG. 8 is rendered over the web page 702, listing the hypertext links available on that particular web page 702. The user can then use the wheel 110 to dial through the hypertext link selections in the menu 800, and select one of them for execution in the execution state 312, such as the High/Low hypertext link.

In an embodiment, various other browser menus can also be accessed by pressing the wheel 110. For example, a first press of the wheel 110 can display browser menu items such as File, Edit, View, Favorites, etc. The wheel 110 can then be dialed to Favorites, for example, and clicked to display the various bookmarks contained therein. The wheel 110 is dialed through the listed bookmarks and clicked to select one of them.

Figure 9:
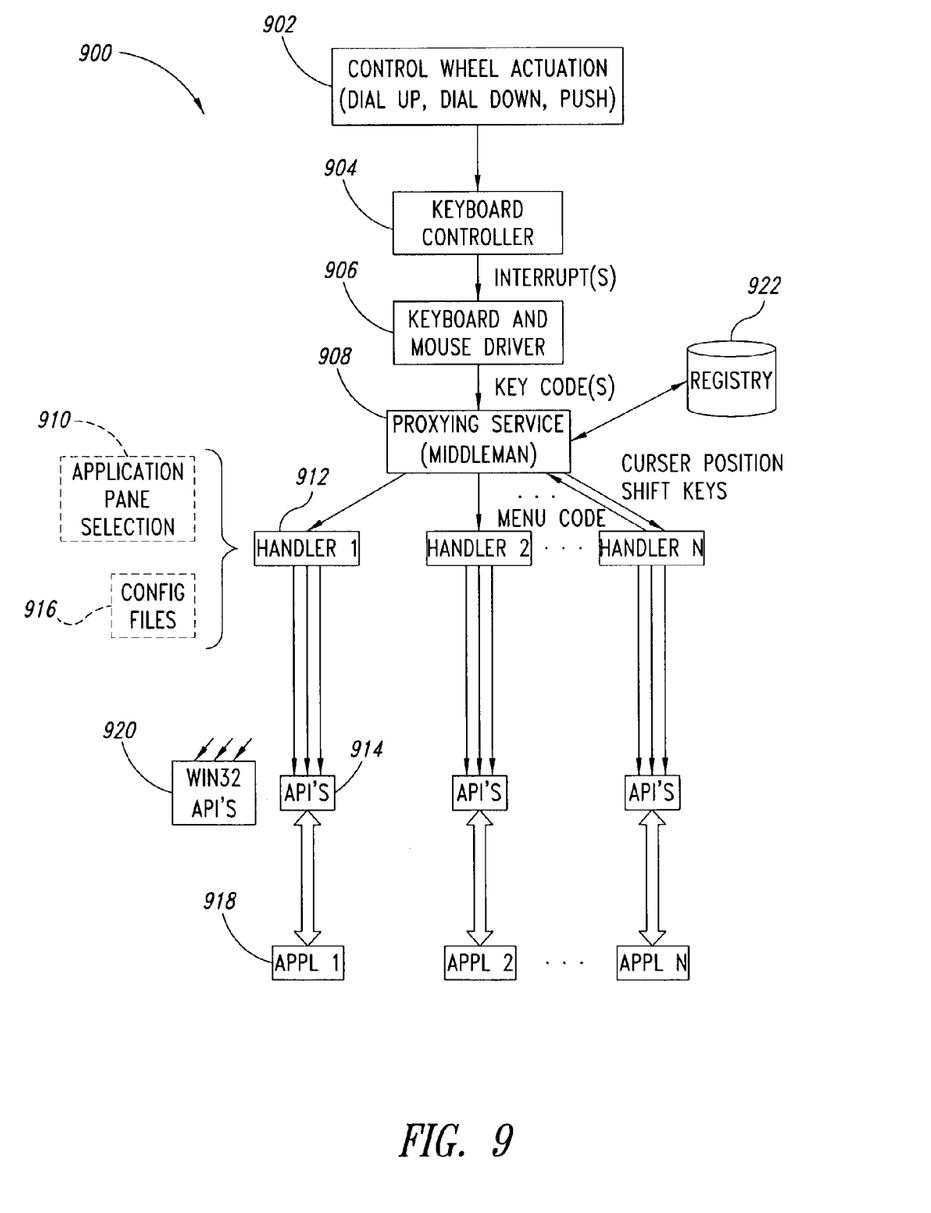
FIG. 9 is a functional block diagram illustrating components that operate in conjunction with the control wheel to provide navigation and selection capabilities in accordance with an embodiment of the invention.

FIG. 9 is a functional block diagram 900 illustrating components that operate in conjunction with the control wheel 110 to provide navigation and selection capabilities in accordance with an embodiment of the invention. At least some of the components of the block diagram 900 can be embodied in software, code, or other machine-readable instruction stored on a machine-readable medium, such as memory in the portable computer 100.

At a block 902, actuation of the control wheel 110 is performed. As described above, this actuation can involve pushing or dialing the control wheel. With regards to dialing, the amount and direction of the dialing is detected. A keyboard controller 904 detects the actuation of the wheel 110 at the block 902, and generates one or more interrupts corresponding to the actuation. The keyboard controller 904 can also generate interrupts related to actuation of keys on the keyboard of the portable computer 100, such as pressing of keys, mouse clicks, and the like.

A keyboard and mouse driver 906 receives the interrupts generated by the keyboard controller 904, and generates one or more key codes corresponding to the interrupt(s). For example, a certain key code is generated by the driver 906 for a push of the wheel 110, another key code for dialing of the wheel 110 a certain distance in a first direction, another key code for dialing of the wheel 110 a certain distance in a second direction, and so on.

A software "middleman" 908 component receives the key code(s) generated by the driver 906. The term "middleman" is used illustratively herein to refer to a proxying service or other similar software component. The middleman 908 knows the cursor position, and in one embodiment, knows if shift keys have been applied in order to request other information or to apply other commands. The middleman 908 also knows which application is currently open.

The middleman 908 correlates the received key code with the information that it knows to determine the corresponding instruction to send to an appropriate one of a plurality of handlers 912 and/or to determine which of the handlers 912 it will communicate with. For example, there may be a separate individual handler 912 for each application installed in the portable computer 100. Thus, for example, Handler 1 is for the email application, Handler 2 is for the web browser application, . . . . Handler N is for the calendar application, and so forth. Each handler 108 registered themselves with the middleman 908 in order to at least one of identify themselves, identify the application to which they correspond, identify the commands or instructions that they accept, and for other purposes. Registry information, which the middleman 908 can consult, is stored in a registry database 922 or other data structure.

Thus, for instance, if the particular key code (received by the middleman 908 from the driver 906) is correlated by the middleman 908 with an email application, the middleman 908 determines and routes the selected application, pane, cursor location and other information to the appropriate handler 912 for the email application. This is generically illustrated in FIG. 9 by an arrow from the middleman 908 to HANDLER N, to convey cursor position information, selected item status (such as information that may be garnered from shift keys), and other information. The handler 912 would then generate a menu of items (e.g., open, reply, delete, etc.), and send this menu code to the middleman 908 for display as a menu of commands for the user, which is generically indicated as a return arrow in FIG. 9 from Handler N to the middleman 908.

In the email example, therefore, the information (related to email) is routed to Handler 1 for the email application. Which command to select for placement in a menu can be determined by having the handler 912 consult configuration files 916, where particular commands are specified (such as via XML files) for applications, their panes, items selected, application- or item-specific information, and so forth, and/or the handler 912 can consult application-related information 910 to determine at least one of an active pane of the current application, the selected item in the active pane, status of the selected item, which commands are enabled for that item or pane, and other information.

Each of the handlers 912 can call a plurality of application program interfaces (APIs) corresponding to their respective application. For an email application, as an example, there can be separate APIs for open, close, reply, forward, delete, and other commands. The handler 912 (to which the command is routed from the middleman 908) calls the appropriate API that corresponds to this command. Which API to call may also be determined in part by the configuration files 916 (which can be XML files). As previously described above, the user can configure the configuration files 916 to specify the available commands, rename the commands, include or exclude certain commands, modify commands, create command icons, and configure various other command options.

An application 918 corresponds to the respective group of APIs 914. In FIG. 9 as an example, the Application 1 can be the email application, the Application 2 can be the web browser application, . . . the Application N can be the calendar application, and so on.

In an embodiment, there may be one or more default handlers that call general APIs, or any one of the handlers 912 can also call the general APIs for non-application-specific functions. For example for a Microsoft Windows™-based system, there may be a plurality of Win32 APIs 920, for operations such as maximize, minimize, open, close, and so forth. The default handler(s) and the Win32 APIs 920 may be used, for instance, in situations where a new software application is installed in the portable computer 100, and it does not include its own handler. The default handler and Win32 APIs 920 may therefore be used for commands directed towards that new application. In other situations, newly installed software applications can include their own handlers that register with the middleman 908 during installation, thereby allowing the user to use the operational capabilities of the wheel 110 without having to write code.

It is also possible for software developers to write handlers 912 for applications. Many applications have their source code protected, but leave their APIs exposed. Thus, with this ready availability of the APIs, new handlers 912 can be written for the particular APIs and registered with the middleman 908, without having to modify the underlying source code of the application itself. Therefore, an embodiment of the invention is extensible and scalable since new applications can be installed into the portable computer 100, and appropriate handlers 912 are provided to allow use of the wheel 110 with the new applications.

With respect to the example screen shots of FIGS. 7-8, the handler 912 (e.g., Handler 2) corresponding to the web browser application (e.g., Application 2) reads the HTML page and extracts or parses the hypertext links therefrom. The handler 912 then places the hypertext links in a menu, and makes this menu available to the middleman 908, so that the user can interact with the menu while using the wheel 110.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while the wheel 110 has been illustrated as having a generally circular shape and being located on the right side of the portable computer 100, it is appreciated that other embodiments may have different shapes (such as oval) and locations. Moreover, while the wheel 110 of an embodiment may be physically turned and pressed, it is possible to provide an embodiment where the wheel 100 has slightly or significantly different actuation. For instance, a pressable trackball may be used in one embodiment. A touch pad that can detect directional fingertip movement and fingertip tapping may also be used alternatively to a physical wheel or trackball in yet another embodiment.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
    a hand-held portable electronic device having a small form factor, wherein the electronic device includes:
    a display screen;
    a control integrated with the electronic device to enable control over navigation and selection within the display screen, wherein a first type of user actuation of the control performs the navigation and wherein a second type of user actuation of the control performs the selection; and
    software to enable operation of the control in conjunction with a pre-existing application installed in the electronic device, wherein the software includes:
        a proxying service component to receive codes corresponding to the first and second types of user actuation of the control;
        a pre-existing handler associated with the pre-existing application, wherein the pre-existing handler can be selected by the proxying service component to receive information associated with the received code; and
        application-related information and user-configuration information that can be correlated by the pre-existing handler with the received code to determine at least one corresponding command for the pre-existing application;
    wherein the software enables a user to configure the operation of the control for the pre-existing application; and
    wherein the software enables extension of the operation of the control to an additional application to be installed in the electronic device without modification of code for the pre-existing and additional applications, the additional application without modification being usable with both the portable electronic device having the small form factor and another electronic device having a larger form factor relative to the portable electronic device;
    wherein the extension of the operation of the control to the additional application includes installing an additional handler that is different from the pre-existing handler,
        wherein the additional handler is registered with the proxying service component during installation; and
        wherein the additional handler enables the proxying service component to interact with the additional application without modification of the code of the additional application.

2. The system of claim 1 wherein the control comprises a wheel, and wherein the first type of user actuation comprises a dial of the wheel and the second type of user actuation comprises a press of the wheel.

3. The system of claim 1 wherein the navigation with the control includes a scroll through a menu that can be presented on the display screen, and wherein the selection with the control includes a selection of an item from the menu.

4. The system of claim 1 wherein the navigation and selection with the control is context-sensitive, based at least in part on one of an application that is currently active on the display screen, a current pane of the active application, and an item in the current pane that is selected.

5. The system of claim 1, further comprising a menu presented on the display screen, the menu including at least one link that is extracted through parsing by the software from a corresponding markup language file of a web page that is concurrently presented on the display screen along with the menu, the control usable to navigate through the menu via the first type of user actuation and usable to select the link from the menu via the second type of user actuation alternatively of selection of the link from the concurrently presented web page.

6. The system of claim 1 wherein the software further includes a plurality of application program interfaces (APIs) for each of the handlers, wherein an appropriate one of the APIs can be called by its corresponding handler to process the corresponding command.

7. The system of claim 1 wherein the at least one of the handlers can generate a menu having the corresponding command, based on the received information associated with the received code that is provided to it by the service component.

8. The system of claim 1 wherein the user-configuration information includes settings to perform at least one of specify the available commands, rename commands, include commands, exclude commands, modify commands, create command icons, and configure command options.

9. The system of claim 1 wherein one of the handlers comprises a default handler to be used with the additional application, if the additional application does not include the additional handler.

10. The system of claim 1 wherein the application-related information includes at least one of data indicative of an application that is currently active on the display screen, data indicative of a current pane of the active application, data indicative of an item in the current pane that is selected, and data indicative of a state of a selected item.

11. The system of claim 1, further comprising:
    a controller to generate interrupts corresponding to the first and second types of user actuation of the control; and a driver in communication with the controller to receive the generated interrupts and to generate codes corresponding thereto, and to provide the generated codes to the service component.

12. The system of claim 3, further comprising a sub-menu for the menu, wherein the second type of user actuation, while in the menu, results in presentation of the sub-menu, and wherein the navigation and selection within the sub-menu can be performed using the first and second types of user actuation of the control, respectively.

13. A hand-held portable apparatus having a small form factor, the apparatus comprising:
   a display screen;
   a control usable with a user interface that can be presented on the display screen;
   software to enable operation of the control in conjunction with a pre-existing installed application associated with the user interface, in a manner that enables user-configuration over the operation of the control and that enables extension of the control to an additional application to be installed, without modification of code for the pre-existing and additional applications;
   wherein the software includes:
      a proxying service component to receive codes corresponding to actuation of the control; and
      a plurality of handlers associated with a corresponding plurality of installed application, wherein at least one of the handlers can be selected by the proxying service component to receive information associated with a received code and related to operation of its associated application;
   wherein the extension of the control to the additional application includes an installation of an additional handler that is registered with the proxying service component, wherein the additional handler enables the proxying service component to interact with the additional application without modification of the code of the additional application;
   the additional application being usable with both the apparatus having the small form factor and another electronic device having a larger form factor relative to the apparatus.

14. The apparatus of claim 13 wherein the control comprises a wheel, and wherein a first type of user actuation of the wheel comprises a dial of the wheel to perform navigation within the user interface and a second type of user actuation of the wheel to perform selection of an element of the user interface comprises a press of the wheel.

15. The apparatus of claim 13 wherein actuation of the control is context-sensitive based on an active element of the user interface.

16. The apparatus of claim 13 wherein actuation of the control results in presentation of a menu on the user interface, the menu having links therein that have been obtained by parsing from a markup language file associated with a web page concurrently presented by the user interface as a result of the actuation of the control, and wherein further actuation of the control enables navigation and selection of at least one of the links within the menu alternatively of selection of that link from the concurrently presented web page.

17. A method usable with a hand-held portable electronic device having a small form factor, the method comprising:
   presenting a user interface on a display screen of the portable electronic device;
   enabling control over navigation and selection within the user interface by using a control present on said portable electronic device that is separate from a keypad of the electronic device, wherein a first type of user actuation of the control performs the navigation and wherein a second type of user actuation of the control performs the selection; and
   on said portable electronic device, operating the control in conjunction with a pre-existing application installed in said portable electronic device and associated with the user interface, including enabling user-configuration over the operation of the control and enabling extension of the operation of the control to an additional application to be installed in the electronic device, substantially without modification of code for the pre-existing and additional applications;
   the additional application being usable with both the portable electronic device having the small form factor and another electronic device having a larger form factor relative to the portable electronic device.

18. The method of claim 17 wherein operating the control on said portable electronic device includes:
   processing a code corresponding to actuation of the control;
   correlating the code to at least one of application-related information and user-configuration information to determine a corresponding command; and
   sending the command from a selected one of a plurality of handlers associated with a corresponding plurality of applications, to enable the application corresponding to that handler to process the command.

19. The method of claim 17 wherein enabling control over navigation and selection includes providing the control as a wheel that can be turned to navigate through the user interface and that can be pushed to select an element from the user interface.

20. The method of claim 19, further comprising operating the control in a context-sensitive manner, based on at least one of the application associated with the user interface, a pane of the user interface that is active, and an item of the pane that is selected.

21. An article of manufacture, comprising:
   a machine-readable medium having instructions stored thereon to:
   control navigation and selection within a user interface of a portable electronic device by using a control wheel of the portable electronic device that is separate from a keypad of the portable electronic device, wherein a first type of user actuation of the wheel performs the navigation and wherein a second type of user actuation of the wheel performs the selection, the portable electronic device having a small form factor;
   on the portable electronic device, operate the wheel in conjunction with a pre-existing application installed in the portable electronic device and associated with the user interface, including instructions to enable user-configuration over the operation of the wheel and to enable extension of the operation of the wheel to an additional application to be installed in the portable electronic device, substantially without modification of code for the pre-existing and additional applications; and
   wherein the instructions to enable extension of the operation of the wheel include a handler that is associated with the additional application, wherein the handler is installed into the machine-readable medium and registered with a proxying service component during installation to enable the proxying service component to interact with the additional application substantially without modification of the code for the additional application, the handler and the proxying service component being present in the portable electronic device, the additional application being usable with both the portable electronic device having the small form factor and another electronic device having a larger form factor relative to the portable electronic device.

22. The article of manufacture of claim 21 wherein the instructions to enable user-configuration over the operation of the wheel include instructions to access configuration files associated with at least one of an application, the wheel, and the user interface.

23. The article of manufacture of claim 21 wherein the instructions to operate the wheel in conjunction with the application includes instructions to:
   process a code corresponding to actuation of the wheel;
   correlate the code to at least one of application-related information and user-configuration information to determine a corresponding command; and
   send the command from a selected one from a plurality of handlers associated with a corresponding plurality of applications, to enable the application corresponding to that handler to process the command.

24. The article of manufacture of claim 21 wherein the machine-readable medium further includes instructions stored thereon to operate the wheel in a context-sensitive manner, based on at least one of the application associated with the user interface, a pane of the user interface that is active, and an item of the pane that is selected.

25. The article of manufacture of claim 21 wherein the machine-readable medium further includes instructions stored thereon to:
   generate a menu on the user interface, the menu corresponding to an application page concurrently presented on the user interface with the menu;
   extract by parsing at least one feature from the application page presented on the user interface, said extracted at least one feature from the application page including a link parsed from a markup language file associated with a web page, and place the extracted feature in the menu; and
   operate the wheel to navigate through the menu via the first type of user actuation and operate the wheel to select the feature from the menu via the second type of user actuation alternatively of selection of the feature from the concurrently presented application page.

26. The method of claim 17, further comprising:
   generating a menu on the user interface, the menu corresponding to an application page concurrently presented on the user interface with the menu;
   extracting by parsing at least one feature from a markup language file associated with the application page presented on the user interface and placing the extracted feature on the menu; and
   operating the control to navigate through the menu via the first type of user actuation and operating the control to select the feature from the menu via the second type of user actuation alternatively of selection of the feature from the concurrently presented application page.

27. The system of claim 5 wherein said link extracted from said markup language file is a hypertext link parsed from a hypertext markup language (HTML) file.

28. The apparatus of claim 16 wherein said links that have been obtained by parsing from said markup language file are hypertext links that have been parsed from a hypertext markup language (HTML) file.

29. The method of claim 26 wherein said at least one feature extracted by parsing from said markup language file is a hypertext link extracted by parsing from a hypertext markup language (HTML) file.

30. The article of manufacture of claim 25 wherein said at least one feature extracted by parsing from said markup language file is a hypertext link extracted by parsing from a hypertext markup language (HTML) file.

* * * * *

UNITED STATES PATENT AND TRADEMARK OFFICE
CERTIFICATE OF CORRECTION

PATENT NO. : 7,376,913 B1
APPLICATION NO. : 10/338815
DATED : May 20, 2008
INVENTOR(S) : Fleck et al.

Page 1 of 1

It is certified that error appears in the above-identified patent and that said Letters Patent is hereby corrected as shown below:

On the Title Page, above item (74) the "Assistant Examiner", delete "Jorany" and insert -- Jordany --, therefor.

Signed and Sealed this

Ninth Day of September, 2008

JON W. DUDAS
*Director of the United States Patent and Trademark Office*